US012717263B2

(12) United States Patent
Ishii

(10) Patent No.: US 12,717,263 B2
(45) Date of Patent: Aug. 25, 2026

(54) IMAGE FORMING APPARATUS INCLUDING SHEET BENDING AMOUNT DETECTION UNIT AND SHEET SPEED CONTROL

(71) Applicant: CANON KABUSHIKI KAISHA, Tokyo (JP)

(72) Inventor: Daiki Ishii, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/985,775

(22) Filed: Dec. 18, 2024

(65) Prior Publication Data

US 2025/0224688 A1 Jul. 10, 2025

(30) Foreign Application Priority Data

Jan. 4, 2024 (JP) ................................ 2024-000215

(51) Int. Cl.

*G03G 15/00* (2006.01)
*B65H 9/00* (2006.01)
(Continued)

(52) U.S. Cl.

CPC ........... *G03G 15/657* (2013.01); *B65H 9/004* (2013.01); *B65H 29/70* (2013.01);
(Continued)

(58) Field of Classification Search

CPC ....... G03G 15/657; G03G 2215/00413; G03G 2215/00616; G03G 2215/00628;
(Continued)

(56) References Cited

U.S. PATENT DOCUMENTS

2003/0156853 A1* 8/2003 Fukutani ............ G03G 15/2064 399/68
2006/0222386 A1* 10/2006 Koshida ............... G03G 15/657 399/68
(Continued)

FOREIGN PATENT DOCUMENTS

JP 2005181507 A 7/2005
JP 2007041188 A 2/2007
(Continued)

*Primary Examiner* — Robert B Beatty
(74) *Attorney, Agent, or Firm* — ROSSI, KIMMS & McDOWELL LLP

(57) ABSTRACT

An image forming apparatus includes a transfer portion, a fixing portion, a detection unit configured to detect a bending amount of the sheet nipped between the transfer portion and the fixing portion, and a control unit. The detection unit includes a rotation portion configured to rotate in a rotation direction from a standby position by being pressed by the sheet nipped by the transfer portion and the fixing portion, a rotary encoder configured to output a pulse signal corresponding to a rotation amount of the rotation portion, and a rotation detector configured to detect that the rotation portion has reached a detection position downstream of the standby position in the rotation direction. The control unit controls a sheet conveyance speed of the fixing portion based on the pulse signal output from the rotary encoder after the rotation detector detects that the rotation portion has reached the detection position.

21 Claims, 8 Drawing Sheets

(51) Int. Cl.
*B65H 29/00* (2006.01)
*B65H 29/70* (2006.01)

(52) U.S. Cl.
CPC ................ *B65H 2301/5121* (2013.01); *B65H 2301/51212* (2013.01); *G03G 2215/00413* (2013.01); *G03G 2215/00616* (2013.01); *G03G 2215/00945* (2013.01); *G03G 2215/2045* (2013.01)

(58) Field of Classification Search
CPC .......... G03G 2215/00738; G03G 2215/00945; G03G 2215/2045; B65H 9/004; B65H 9/006; B65H 9/06; B65H 29/70; B65H 2301/5121; B65H 2301/51212; B65H 2301/512125; B65H 2515/81; B65H 2801/06
USPC .......................................................... 399/400
See application file for complete search history.

(56) References Cited

U.S. PATENT DOCUMENTS

| | | | | |
|---|---|---|---|---|
| 2006/0222394 | A1* | 10/2006 | Koshida | G03G 15/657 399/68 |
| 2007/0182091 | A1* | 8/2007 | Kubochi | G03G 15/657 271/265.01 |
| 2007/0264033 | A1* | 11/2007 | Koshida | G03G 15/657 399/16 |
| 2009/0162121 | A1* | 6/2009 | Kitan | G03G 15/657 399/400 |
| 2016/0221781 | A1* | 8/2016 | Yoshida | B65H 9/006 |
| 2016/0274507 | A1* | 9/2016 | Kurita | G03G 15/5062 |
| 2017/0123354 | A1* | 5/2017 | Ebihara | G03G 15/2039 |
| 2017/0227897 | A1* | 8/2017 | Kaino | G03G 15/2028 |
| 2018/0335744 | A1* | 11/2018 | Nakamura | G03G 15/70 |
| 2019/0086843 | A1* | 3/2019 | Sato | G03G 15/5029 |
| 2023/0221665 | A1* | 7/2023 | Aihara | G03G 15/657 399/68 |
| 2024/0255877 | A1* | 8/2024 | Kanou | G03G 15/5008 |
| 2025/0130519 | A1* | 4/2025 | Mizuguchi | G03G 15/2064 |
| 2025/0130522 | A1* | 4/2025 | Mizuguchi | G03G 15/657 |
| 2025/0138455 | A1* | 5/2025 | Kayama | G03G 15/5029 |
| 2025/0164914 | A1* | 5/2025 | Suzuki | G03G 15/2064 |

FOREIGN PATENT DOCUMENTS

| | | | | | |
|---|---|---|---|---|---|
| JP | 2008076680 | A | | 4/2008 | |
| JP | 2008158076 | A | | 7/2008 | |
| JP | 2016160077 | A | * | 9/2016 | B65H 9/06 |
| JP | 2018177446 | A | * | 11/2018 | B65H 9/06 |

* cited by examiner

IMAGE FORMING APPARATUS INCLUDING SHEET BENDING AMOUNT DETECTION UNIT AND SHEET SPEED CONTROL

BACKGROUND OF THE INVENTION

Field of the Invention

The present invention relates to an image forming apparatus that forms an image on a sheet.

Description of the Related Art

JP 2005-181507 A proposes a loop detection sensor for determining whether or not the amount of loop formed on a sheet by a transfer portion and a fixing roller has reached a certain amount. The loop detection sensor includes a mechanical flag that rotates by coming into contact with the sheet, and a photo-interrupter capable of transitioning to a light shielding state and a light transmitting state according to the rotation of the mechanical flag.

Meanwhile, there are various types of sheets used in the image forming apparatus, such as thin paper, plain paper, and thick paper. It is known that an appropriate loop amount varies depending on the type of sheet. However, the loop detection sensor disclosed in JP 2005-181507 A can detect only one type of loop amount, and it is difficult to control loop amounts (bending amounts) corresponding to various types of sheets.

In addition, JP 2007-041188 A proposes an image forming apparatus in which two light transmissive loop detection sensors are provided between a secondary transfer portion and a fixing device. The image forming apparatus includes an actuator that rotates by coming into contact with a sheet, and the actuator includes two protruding pieces capable of blocking optical axes of the two loop detection sensors. The two loop detection sensors output OFF signals when the optical axes are blocked by the protruding pieces, and output ON signals in a state where the optical axes are not blocked. The image forming apparatus can detect four types of loop amounts by a combination of signals of the two loop detection sensors.

In recent years, there has been a demand for an image forming apparatus capable of detecting a plurality of types of bending amounts (loop amounts) and improving accuracy in detecting the bending amounts.

SUMMARY OF THE INVENTION

According to one aspect of the present invention, an image forming apparatus includes a transfer portion configured to convey a sheet while nipping the sheet and transfer a toner image to the sheet, a fixing portion configured to convey the sheet while nipping the sheet and fix the toner image transferred by the transfer portion to the sheet, a detection unit disposed between the transfer portion and the fixing portion in a sheet conveyance direction and configured to detect a bending amount of the sheet nipped between the transfer portion and the fixing portion, and a control unit. The detection unit includes a rotation portion configured to rotate in a rotation direction from a standby position by being pressed by the sheet nipped by the transfer portion and the fixing portion, a rotary encoder configured to output a pulse signal corresponding to a rotation amount of the rotation portion, and a rotation detector configured to detect that the rotation portion has reached a detection position downstream of the standby position in the rotation direction. The control unit controls a sheet conveyance speed of the fixing portion based on the pulse signal output from the rotary encoder after the rotation detector detects that the rotation portion has reached the detection position.

Further features of the present invention will become apparent from the following description of exemplary embodiments with reference to the attached drawings.

DESCRIPTION OF THE EMBODIMENTS

Overall Configuration

Figure 1:
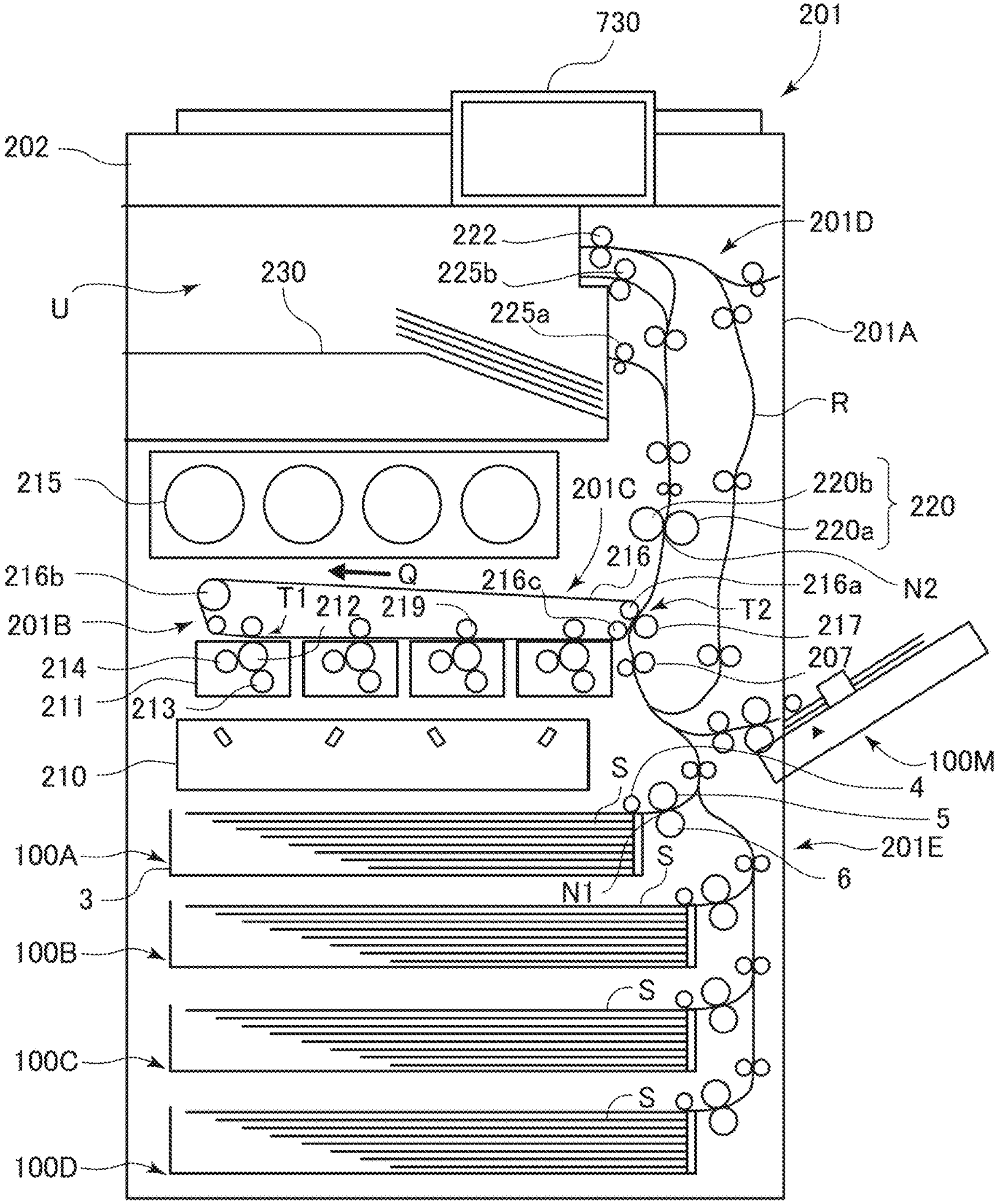
FIG. 1 is an overall schematic view illustrating a cross-sectional configuration of an image forming apparatus according to a first embodiment.

FIG. 1 is an overall schematic view illustrating a cross-sectional configuration of an image forming apparatus 201 according to the present invention. The image forming apparatus 201 is an electrophotographic full-color laser beam printer. As illustrated in FIG. 1, the image forming apparatus 201 includes a printer body 201A which is an apparatus body, and a reading device 202 that is provided on the printer body 201A and reads image data of a document.

Note that the image forming apparatus includes a printer, a copier, a facsimile, and a multifunction peripheral, and refers to an apparatus that forms an image on a sheet used as a recording medium based on image information input from an external personal computer (PC) or image information read from a document. In addition to including the body having an image forming function, the image forming apparatus may be connected to accessory equipment such as an option feeder, an image reading device, or a sheet processing device, and the entire system to which such accessory equipment is connected is also a type of the image forming apparatus.

The printer body 201A includes an image forming unit 201B that forms an image on a sheet S, a fixing portion 220 that fixes the image on the sheet S, and the like. A discharge space U in which the sheet S is discharged is formed between the reading device 202 and the printer body 201A, and a discharge tray 230 on which the discharged sheet Sis stacked is provided in the discharge space U. The printer body 201A is provided with a sheet feeding unit 201E that feeds the sheet S to the image forming unit 201B. The sheet feeding unit 201E includes cassette feeding devices 100A, 100B, 100C, and 100D disposed at a lower portion of the printer body 201A, and a manual feeding device 100M disposed at a right side portion of the printer body 201A.

The four-stage cassette feeding devices 100A, 100B, 100C, and 100D and the manual feeding device 100M have the same configuration. Therefore, only the cassette feeding device 100A will be described, and a description of the other cassette feeding devices 100B, 100C, and 100D and the manual feeding device 100M will be omitted.

The cassette feeding device 100A includes a cassette 3 on which the sheets S are stacked and which can be pulled out and mounted on the printer body 201A, a pickup roller 4 that feeds the sheets stacked on the cassette 3, a feed roller 5, and a retard roller 6. The feed roller 5 conveys the sheet fed by the pickup roller 4. The retard roller 6 forms a separation nip N1 together with the feed roller 5 to separate the sheets one by one.

The image forming unit 201B is a so-called four-drum full-color image forming unit including a laser scanner 210, four process cartridges 211, and an intermediate transfer portion 201C. The process cartridges form toner images of respective colors of yellow (Y), magenta (M), cyan (C), and black (K), respectively. Each process cartridge 211 includes a photosensitive drum 212, a charger 213, a developing device 214, a cleaner (not illustrated), and the like. A toner cartridge 215 containing toners of the respective colors is detachably mounted on the printer body 201A above the image forming unit 201B.

The intermediate transfer portion 201C includes an intermediate transfer belt 216 wound around a driving roller 216*a*, tension rollers 216*b* and 216*c*, and the intermediate transfer belt 216 is disposed on the four process cartridges 211. The intermediate transfer belt 216 is disposed so as to be in contact with the photosensitive drum 212 of each process cartridge 211, and is rotationally driven in a counterclockwise direction (a direction of arrow Q) by the driving roller 216*a* driven by a driving unit (not illustrated). The intermediate transfer portion 201C includes a primary transfer roller 219 that comes into contact with an inner peripheral surface of the intermediate transfer belt 216 at a position facing each photosensitive drum 212, and a primary transfer portion T1 is formed as a nip portion between the intermediate transfer belt 216 and the photosensitive drum 212. The image forming unit 201B includes a secondary transfer roller 217 that comes into contact with an outer peripheral surface of the intermediate transfer belt 216 at a position facing the driving roller 216*a*. A secondary transfer portion T2 at which the toner image borne on the intermediate transfer belt 216 is transferred to the sheet S is formed as a nip portion between the secondary transfer roller 217 and the intermediate transfer belt 216.

The fixing portion 220 includes a pressure roller 220*a* and a heating roller 220*b* incorporating a heater, and the pressure roller 220*a* and the heating roller 220*b* form a fixing nip N2 serving as a fixing portion. The pressure roller 220*a* is biased so as to be in pressure contact with the heating roller 220*b*. For example, an endless film or belt heated by a heater such as a ceramic heater may be applied instead of the heating roller 220*b*. Alternatively, a belt including a heat generation layer that generates heat by electromagnetic induction heating may be applied instead of the heating roller 220*b*.

A first discharge roller pair 225*a* and a second discharge roller pair 225*b*, and a reverse conveyance unit 201D are provided above the fixing portion 220. The first discharge roller pair 225*a* and the second discharge roller pair 225*b* discharge the sheet S into the discharge space U and stack the sheet S on the discharge tray 230. The reverse conveyance unit 201D includes a reverse conveyance roller pair 222 capable of performing forward rotation and reverse rotation, and the reverse conveyance roller pair 222 conveys the sheet S to a re-conveyance passage R by switching back the sheet S.

In each process cartridge 211 configured as described above, an electrostatic latent image is drawn on the surface of the photosensitive drum 212 by the laser scanner 210, and then the toner is supplied from the developing device 214, whereby the toner images of the respective colors charged to a negative polarity are formed. When a positive transfer bias voltage is applied to the primary transfer roller 219, the toner images are sequentially subjected to multiple transfer (primary transfer) to the intermediate transfer belt 216 at the respective primary transfer portions T1, as a result of which a full-color toner image is formed on the intermediate transfer belt 216.

In parallel with such a toner image forming process, the sheet S fed from the sheet feeding unit 201E is conveyed toward a registration roller pair 207, and is subjected to skew feeding correction by the registration roller pair 207. The registration roller pair 207 conveys the sheet S to the secondary transfer portion T2 at a timing corresponding to a transfer timing of the full-color toner image formed on the intermediate transfer belt 216. The toner image borne on the intermediate transfer belt 216 is secondarily transferred to the sheet S at the secondary transfer portion T2 when a positive transfer bias voltage is applied to the secondary transfer roller 217.

The sheet S to which the toner image has been transferred is heated and pressed at the fixing nip N2 of the fixing portion 220, and the color image is fixed to the sheet S. The sheet S on which the image is fixed is discharged and stacked on the discharge tray 230 by the first discharge roller pair 225*a* or the second discharge roller pair 225*b*. In a case of forming images on both sides of the sheet S, the sheet S passes through the fixing portion 220 and is then switched back by the reverse conveyance roller pair 222. Then, the sheet S is conveyed again to the image forming unit 201B via the re-conveyance passage R, and the image is formed on the back side of the sheet S.

The above-described image forming unit 201B is configured to transfer the full-color toner image to the sheet S via the intermediate transfer belt 216, but is not limited thereto. For example, the image forming unit 201B may use a direct transfer type electrophotographic unit that transfers a toner image formed on a photosensitive member to a sheet without using an intermediate transfer body.

In addition, an operation unit 730 that receives an operation from a user is provided at an upper portion of the image forming apparatus 201. The operation unit 730 is implemented by, for example, a touch panel, a physical key, or the like.

Bending Sensor

Figure 2:
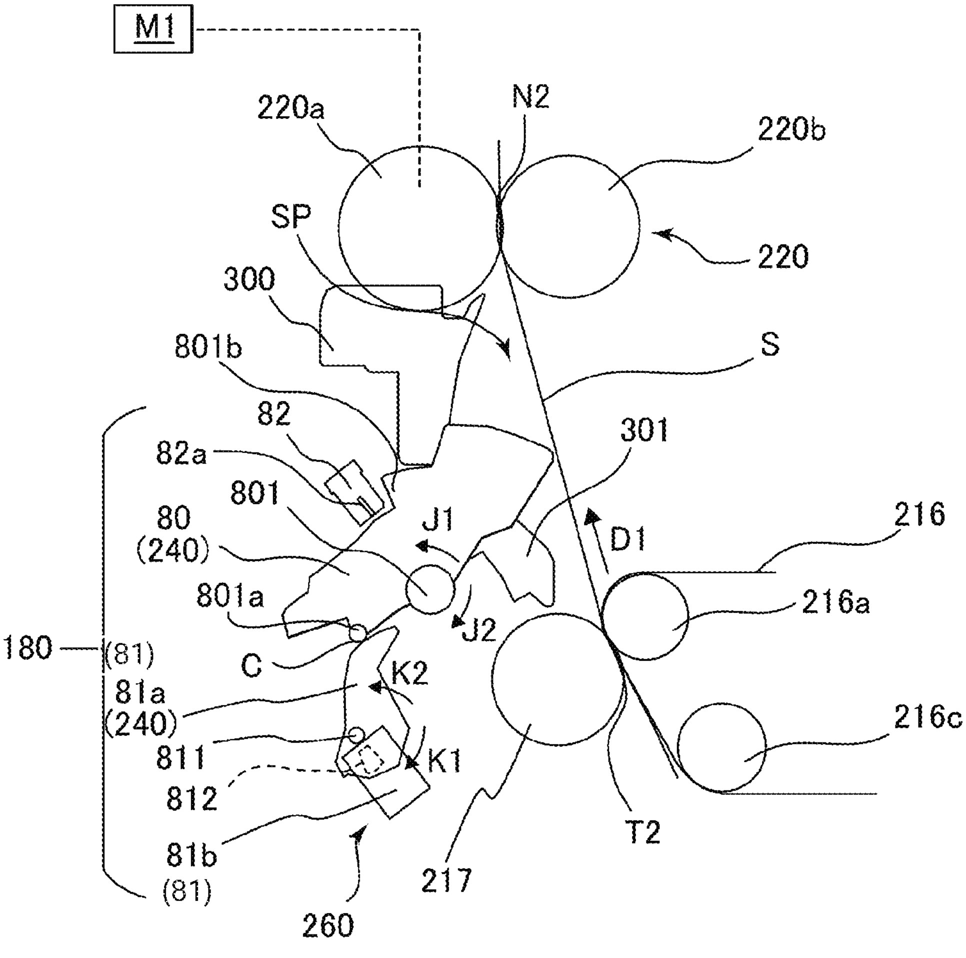
FIG. 2 is a cross-sectional view illustrating a detection unit.

Next, a detection unit 180 disposed between the secondary transfer portion T2 and the fixing nip N2 and a peripheral configuration thereof will be described with reference to FIG. 2. FIG. 2 is a cross-sectional view illustrating the detection unit 180.

As illustrated in FIG. 2, the sheet S is conveyed in a sheet conveyance direction D1 by the secondary transfer portion T2. Conveyance guides 300 and 301 and the detection unit 180 are disposed between the secondary transfer portion T2 and the fixing nip N2 in the sheet conveyance direction D1. The conveyance guides 300 and 301 are disposed only on a non-image surface side of the sheet S so as not to disturb an unfixed image on the sheet S. That is, no conveyance guide is provided on an image surface side where the sheet S comes into contact with the intermediate transfer belt 216, and an image surface of the sheet S does not rub against any member of the printer body 201A from the secondary transfer portion T2 to the fixing nip N2.

The conveyance guide 301 smoothly guides the sheet S conveyed by the secondary transfer portion T2 serving as a transfer portion to the conveyance guide 300. The conveyance guide 300 guides the sheet S toward the fixing nip N2. The conveyance guides 300 and 301 may be configured integrally with each other or may be configured separately from each other.

The conveyance guides 300 and 301 do not linearly guide the sheet S between the secondary transfer portion T2 and the fixing nip N2, and are configured such that the sheet S can be bent toward the conveyance guides 300 and 301. In this manner, the conveyance guides 300 and 301 form a bending formation space SP in which the sheet S can be bent. Here, in the present embodiment, a state in which the sheet S is curved instead of being straight when viewed in a rotation axis direction of the secondary transfer roller 217 is referred to as "being bent" or "forming a loop". That is, the term "loop" in the present embodiment means bending of the sheet S.

The detection unit 180 is disposed at a central portion of a conveyance path between the secondary transfer portion T2 and the fixing nip N2 in a width direction orthogonal to the sheet conveyance direction D1. The width direction is a direction parallel to the rotation axis direction of the secondary transfer roller 217 and the pressure roller 220*a*. The detection unit 180 can detect a bending amount of the sheet S in the bending formation space SP. The bending amount indicates the amount (distance) of bending of the straight sheet S toward the bending formation space SP when viewed in the width direction. For example, the bending amount can be expressed by a distance from a straight line connecting the secondary transfer portion T2 and the fixing nip N2 to an apex of bending (loop) of the sheet S.

The detection unit 180 is disposed at a substantially intermediate position between the secondary transfer portion T2 and the fixing nip N2 in the sheet conveyance direction D1, and can accurately detect the bending amount of the sheet S. In addition, since the detection unit 180 is disposed at a central portion of the bending formation space SP in the width direction, it is possible to detect bending amounts of sheets from a minimum-size sheet to a maximum-sized sheet that can be used in the image forming apparatus 201.

The detection unit 180 includes a first flag 80 serving as a first rotation member, a bending amount detection sensor 81, and a detection position sensor 82 serving as a rotation detector. The bending amount detection sensor 81 includes a second flag 81*a* serving as a second rotation member and a detector 81*b*. The first flag 80 is supported so as to be rotatable about a first rotation shaft 801, and includes a contact portion 801*a* and a light shielding portion 801*b*. In addition, the first flag 80 is configured such that a tip portion protrudes from the conveyance guide 301 to the bending formation space SP at a standby position illustrated in FIG. 2. For example, an opening portion through which the first flag 80 penetrates is formed in the conveyance guide 301. Further, the first flag 80 is biased by a spring (not illustrated) so as to be positioned at the standby position in a natural state. The contact portion 801*a* is configured to be able to come into contact with or rub against the second flag 81*a*.

The second flag 81*a* is supported so as to be rotatable about a second rotation shaft 811 different from the first rotation shaft 801, and includes a detected portion 812. When the detection unit 180 is in a standby state, the contact portion 801*a* and the second flag 81*a* are in contact with each other at a contact point C. At this time, each of the first flag 80 and the second flag 81*a* is positioned at the standby position. At this time, the sheet S is not in contact with the first flag 80.

The first flag 80 is pressed by the sheet S nipped by the secondary transfer portion T2 and the fixing nip N2, thereby rotating in a direction of arrow J1 about the first rotation shaft 801. The second flag 81*a* rotates in a direction of arrow K1 from the standby position in conjunction with the rotation of the first flag 80 pressed by the sheet S. The first flag 80 and the second flag 81*a* form a rotation portion 240 that rotates by being pressed by the sheet S. Then, the detector 81*b* can detect a rotation amount of the second flag 81*a* in the direction of arrow K1 from the standby position. For example, the detector 81*b* is implemented by a photo-interrupter including a light emitting element and a light receiving element, and the detector 81*b* and the second flag 81*a* form a photoelectric rotary encoder 260. The light emitting element of the photo-interrupter includes, for example, a light emitting diode, and the light receiving element includes, for example, a phototransistor.

In a case where the rotary encoder 260 is a transmissive encoder, the detected portion 812 has a plurality of slits through which light emitted from the light emitting element can pass. In a case where the rotary encoder 260 is a reflective encoder, the detected portion 812 has a plurality of unevennesses or slits that can reflect or cannot reflect light emitted from the light emitting element. The light receiving element of the detector 81*b* outputs a current corresponding to the amount of received light, and a waveform shaping circuit in the rotary encoder 260 converts a waveform of the current into a pulse signal and outputs the pulse signal as a voltage signal. In other words, the rotary encoder 260 outputs a pulse signal corresponding to a rotation amount of the rotation portion 240.

When the bending amount of the sheet S nipped by the secondary transfer portion T2 and the fixing nip N2 decreases, the first flag 80 and the second flag 81*a* perform an operation opposite to the above-described operation. That is, when the bending amount of the sheet S decreases, the first flag 80 rotates in a direction of arrow J2 that is opposite to the direction of arrow J1, and the second flag 81*a* rotates in a direction of arrow K2 that is opposite to the direction of arrow K1. The rotary encoder 260 can detect each of rotation amounts of the second flag 81*a* in the direction of arrow K1 and the direction of arrow K2.

The detection position sensor 82 is implemented by, for example, a photo-interrupter including a light emitting element and a light receiving element, and includes an optical path 82*a* between the light emitting element and the light receiving element. When the optical path 82*a* is blocked by the light shielding portion 801*b* of the first flag 80, an output value such as a signal of the detection position sensor 82 changes. Here, positions of the first flag 80 and the second flag 81*a* when the optical path 82*a* is blocked by the light shielding portion 801*b* are set as detection positions. That is, each of the first flag 80 and the second flag 81*a* is movable to the standby position and the detection position. The detection position is a position downstream of the standby position in the direction of arrow J1 serving as a rotation direction. That is, the detection position sensor 82 can detect that the first flag 80 and the second flag 81*a* have reached the detection positions. In other words, the detection position sensor 82 can detect that the rotation portion 240 formed by the first flag 80 and the second flag 81*a* has reached the detection position.

Figure 3:
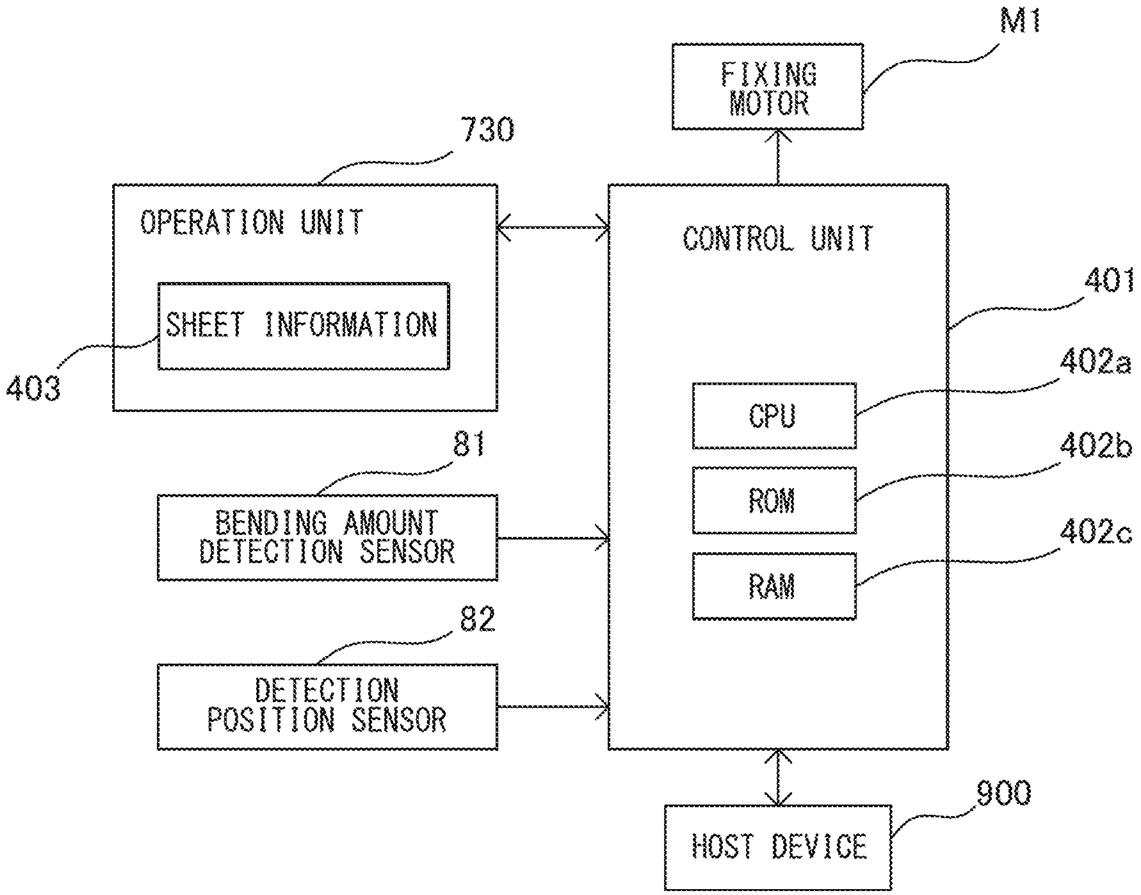
FIG. 3 is a control block diagram of a control unit.

FIG. 3 is a control block diagram of a control unit 401 of the image forming apparatus 201. The control unit 401 includes a central processing unit (CPU) 402*a*, a read only memory (ROM) 402*b*, and a random access memory (RAM) 402*c*. The CPU 402*a* reads and executes various programs stored in the ROM 402*b*. The RAM 402*c* is used as a work area of the CPU 402*a*.

The bending amount detection sensor 81 and the detection position sensor 82 are connected to an input side of the control unit 401. A fixing motor M1 that drives the pressure roller 220*a* is connected to an output side of the control unit 401. In addition, the operation unit 730 and a host device 900 are connected to the control unit 401. Information regarding a stiffness of the sheet S used in the image forming apparatus 201, that is, sheet information 403 such as a size or grammage is input to the control unit 401 through the operation of the operation unit 730 by the user. In addition, the control unit 401 outputs an image forming signal to the laser scanner 210 based on image data output from the host device 900. The host device 900 is a personal computer, an image scanner, a facsimile, or the like.

The bending amount of the sheet S increases in a case where a speed of conveyance of the sheet S by the fixing nip N2 (hereinafter, referred to as fixing conveyance speed) is lower than a speed of conveyance of the sheet S by the secondary transfer portion T2 (hereinafter, referred to as transfer conveyance speed). The bending amount of the sheet S decreases in a case where the fixing conveyance speed is higher than the transfer conveyance speed. Then, the control unit 401 can control the fixing motor M1 based on a detection result of the detection unit 180, thereby adjusting the bending amount of the sheet S. The fixing conveyance speed is the same as circumferential speeds of the pressure roller 220*a* and the heating roller 220*b*.

Variation in Standby Position of First Flag

Figure 4:
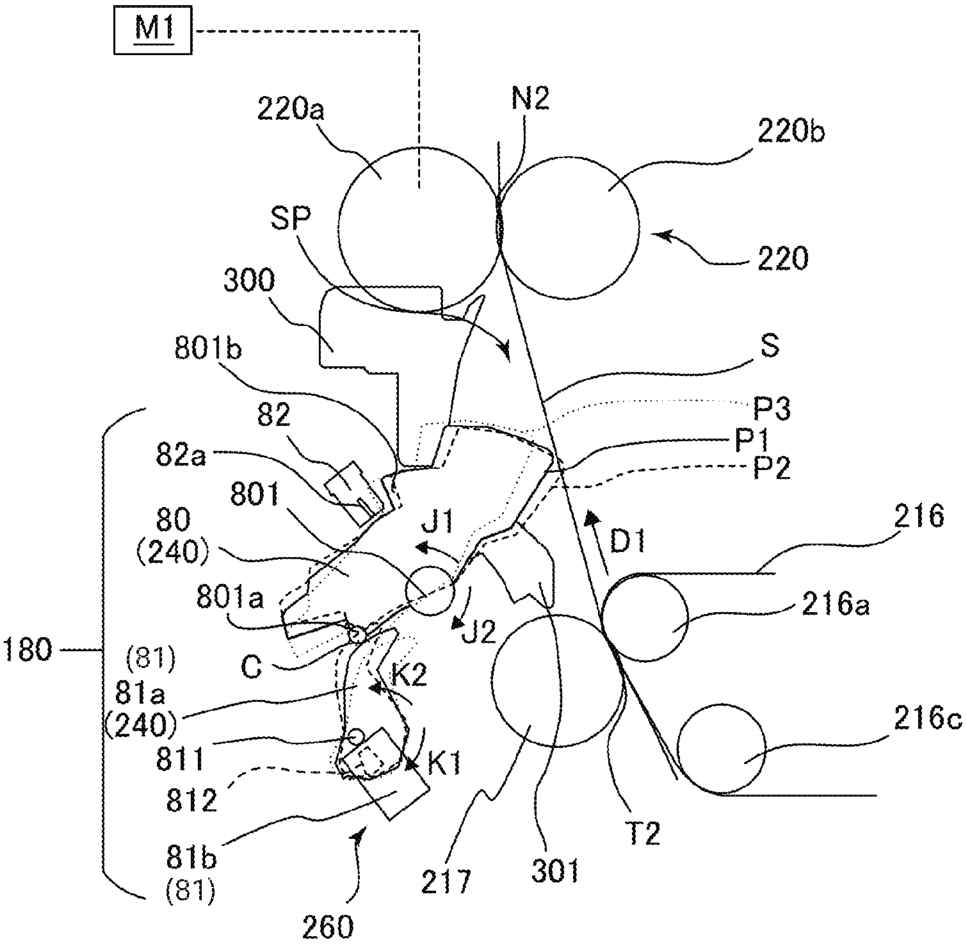
FIG. 4 is a view for describing a variation in a standby position of a first flag.

FIG. 4 is a view for describing a variation in the standby position of the first flag 80. As described above, the first flag 80 is biased to the standby position by a spring (not illustrated). However, an increase in biasing force of the spring may affect the bending (loop) of the sheet S, and thus, it is desirable to reduce the biasing force of the spring. When the biasing force of the spring is reduced, the standby position of the first flag 80 may vary like positions P1, P2, and P3 illustrated in FIG. 4. For example, even if a target standby position is the position P1, the first flag 80 may stand by at the position P3 downstream of the position P1 in the direction of arrow J1 or at the position P2 downstream of the position P1 in the direction of arrow J2.

In such a case, in a case where the bending amount of the sheet S is detected using only the pulse signal output from the detector 81*b* of the bending amount detection sensor 81, a bending amount detection result varies if the standby position of the first flag 80 varies. Then, a deviation may occur between the actual bending amount of the sheet S and the bending amount detection result, and appropriate bending control may not be performed.

For example, when appropriate bending control cannot be performed, and the intermediate transfer belt 216 receives an external force from the sheet S at the secondary transfer portion T2, a transfer position in the primary transfer of the toner images is shifted, and a problem of color shift occurs. In addition, when a posture of the sheet S becomes unstable at a position upstream of the fixing nip N2 in the sheet conveyance direction D1, the sheet S may be wrinkled when passing through the fixing nip N2. In addition, in a case where the sheet S is pulled between the secondary transfer portion T2 and the fixing nip N2, when a trailing edge of the sheet S passes through a roller pair positioned upstream of the secondary transfer portion T2 in the sheet conveyance direction D1, the sheet S may shake and image disturbance may occur at the secondary transfer portion T2. As described above, if the appropriate bending control cannot be performed, a possibility of occurrence of the color shift, paper wrinkles, image disturbance, and the like increases.

Figure 5:
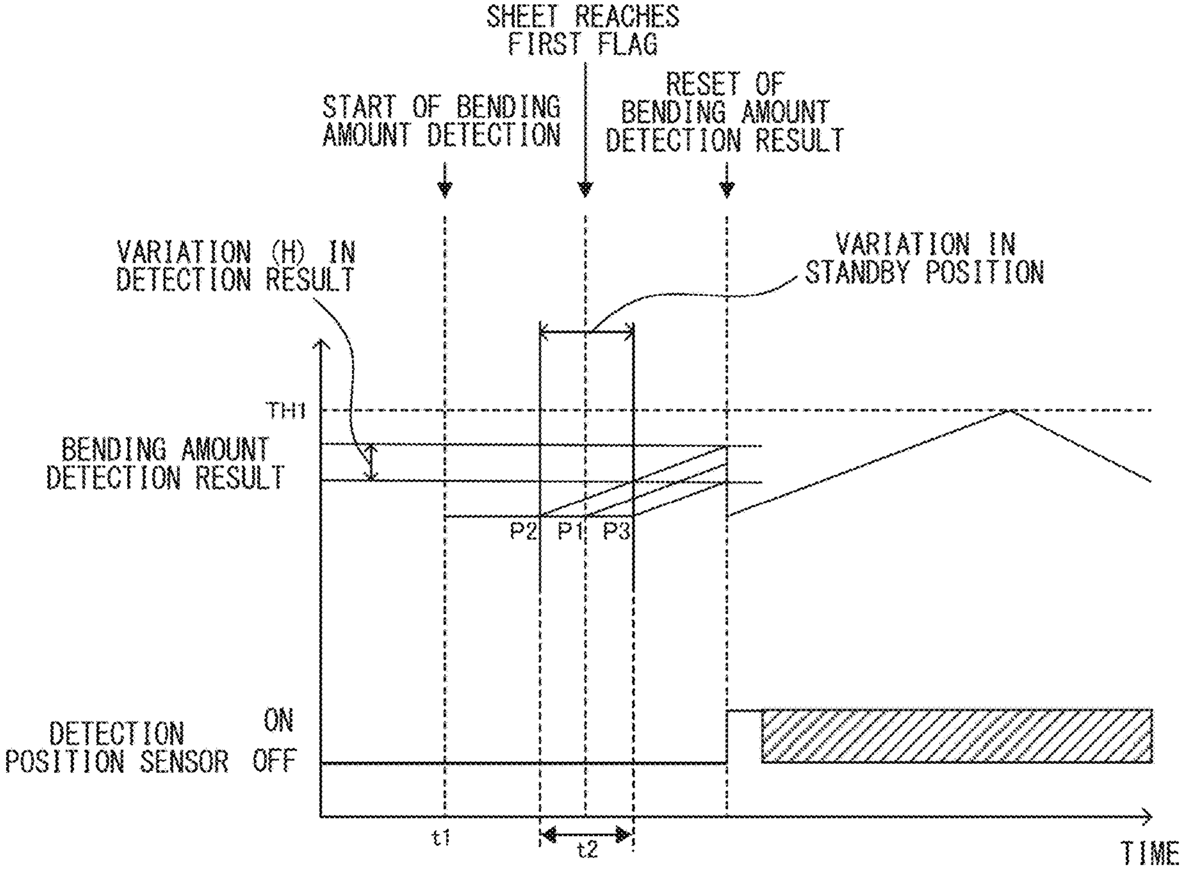
FIG. 5 is a timing chart illustrating detection timings of a detection position sensor and a bending amount detection sensor.

FIG. 5 is a timing chart illustrating detection timings of the detection position sensor 82 and the bending amount detection sensor 81. As illustrated in FIG. 5, when bending amount detection starts at time t1, the bending of the sheet S nipped by the secondary transfer portion T2 and the fixing nip N2 increases, and a surface of the sheet S reaches the first flag 80 at time t2. However, as described above, when the standby position of the first flag 80 varies, time t2 also varies. The variation in the standby position appears as a variation (H) in the detector 81*b* of the bending amount detection sensor 81.

Bending Amount Control

Figure 6:
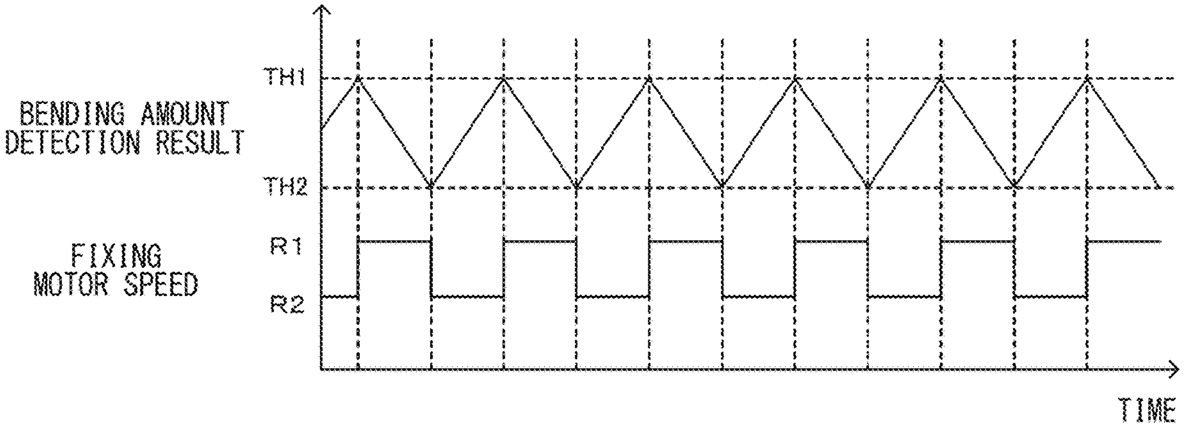
FIG. 6 is a timing chart illustrating speed control of a fixing motor in bending amount control.
Figure 7:
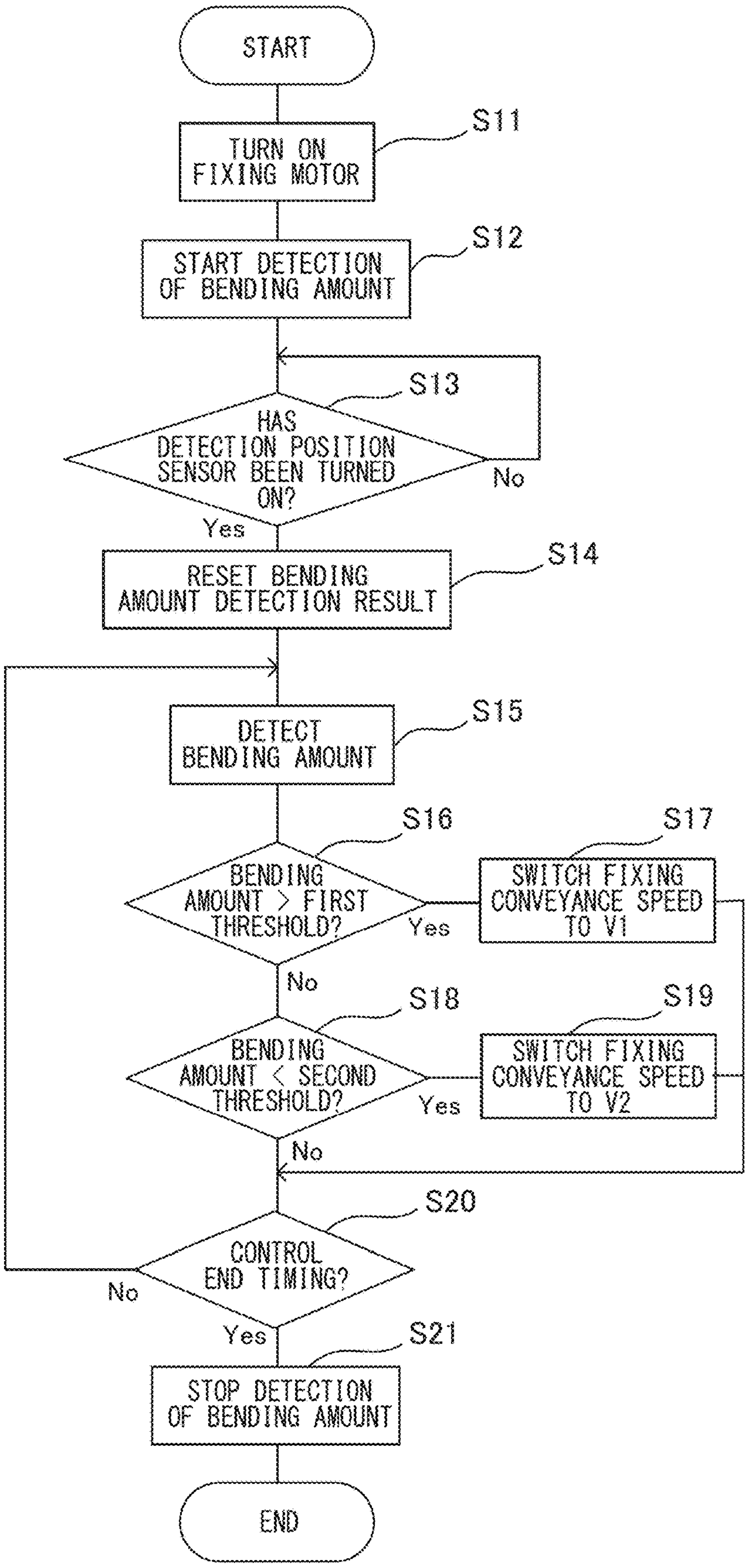
FIG. 7 is a flowchart illustrating bending amount control.

The bending amount control (loop amount control) according to the present embodiment for coping with such a problem will be described with reference to FIGS. 5 to 7. FIG. 6 is a timing chart illustrating speed control of the fixing motor M1 in the bending amount control. FIG. 7 is a flowchart illustrating the bending amount control.

Next, the bending amount control for the sheet S by the control unit 401 will be described. The control unit 401 can perform the bending amount control for controlling the speed of conveyance of the sheet by the fixing nip N2 based on the detection result of the detection unit 180.

The user inputs the sheet information 403 (see FIG. 3) such as the size and grammage of the sheet S to be used through the operation unit 730 before starting a print job. Then, after the sheet information is input, the print job is started. Then, as illustrated in FIG. 7, the control unit 401 starts driving of the fixing motor M1 such that the fixing conveyance speed becomes a speed V0 (step S11).

In the present embodiment, the fixing conveyance speed (V0) at the start of the print job is set to be slightly lower than the transfer conveyance speed. Therefore, the sheet S conveyed by the secondary transfer portion T2 is conveyed so as to be gradually bent after reaching the fixing nip N2. As a result, the sheet S is not pulled by the fixing nip N2, and scattering of the unfixed toner image transferred to the sheet S can be suppressed.

Next, the control unit 401 starts detection of the bending amount of the sheet S by the detection unit 180 (step S12). In other words, the control unit 401 starts counting of the pulse signals output from the bending amount detection sensor 81 of the detection unit 180. Then, the control unit 401 determines whether or not the detection position sensor 82 has been turned on (step S13). In the present embodiment, when the optical path 82*a* of the detection position sensor 82 is blocked by the light shielding portion 801*b* of the first flag 80, the detection position sensor 82 is turned on, but the present technology is not limited thereto. For example, the light shielding portion 801*b* may block the optical path 82*a* of the detection position sensor 82 to turn off the detection position sensor 82, and the control unit 401 may determine in step S13 whether or not the detection position sensor 82 has been turned off.

As described above, the fixing conveyance speed (V0) is lower than the transfer conveyance speed, and thus, the bending amount of the sheet S increases, and the first flag 80 rotates in the direction of arrow J1 in FIG. 4. When the bending amount of the sheet S becomes equal to or greater than a predetermined amount, the first flag 80 reaches the detection position, and the detection position sensor 82 is turned on.

In a case where it is determined that the detection position sensor 82 has been turned on (step S13: No), the control unit 401 resets the detection result of the bending amount detection sensor 81, that is, a count of the pulse signals output from the bending amount detection sensor 81 (step S14). Then, the control unit 401 newly starts detection of the bending amount. In other words, the control unit 401 starts counting of the pulse signals output from the bending amount detection sensor 81 of the detection unit 180 again.

An influence of the variation in the standby position of the first flag 80 can be reset by resetting the detection result of the bending amount, that is, the count of the pulse signals of the bending amount detection sensor 81, when the detection position sensor 82 is first turned on after the bending amount control is started as illustrated in FIG. 5. In other words, since the pulse signal output from the bending amount detection sensor 81 varies until the first flag 80 rotates from the standby position to the detection position, the pulse signal is reset. Then, the control unit 401 detects the bending amount of the sheet S and controls the fixing conveyance speed based on the pulse signal output from the bending amount detection sensor 81 (rotary encoder 260) after the first flag 80 reaches the detection position.

As illustrated in FIG. 7, the control unit 401 then determines whether or not the detected bending amount of the sheet S is larger than a first threshold TH1 (step S16). In a case where it is determined that the bending amount of the sheet S is larger than the first threshold TH1 (step S16: Yes), the control unit 401 switches the fixing conveyance speed to a speed V1 higher than the speed V0 (step S17), and proceeds to step S20.

In a case where it is determined that the detected bending amount of the sheet S is smaller than the first threshold TH1 (step S16: No), the control unit 401 determines whether or not the bending amount of the sheet S is smaller than a second threshold TH2 (step S18). The second threshold TH2 is smaller than the first threshold TH1. In a case where it is determined that the bending amount of the sheet S is smaller than the second threshold TH2 (step S18: Yes), the control unit 401 switches the fixing conveyance speed to a speed V2 lower than the speeds V0 and V1 (step S19), and proceeds to step S20. In a case where it is determined that the bending amount of the sheet S is larger than the second threshold TH2 (step S18: No), the control unit 401 proceeds to step S20 without changing the fixing conveyance speed.

In step S20, the control unit 401 determines whether or not a bending amount control end timing has been reached (step S20). For example, the bending amount control end timing is a timing at which the trailing edge of the last sheet of the job passes through the secondary transfer portion T2. In a case where it is determined that the bending amount control end timing has not been reached (step S20: No), the control unit 401 returns to step S15.

A relationship among the first threshold TH1, the second threshold TH2, and the speed of the fixing motor M1 is illustrated in the timing chart of FIG. 6. The first threshold TH1 and the second threshold TH2 are determined based on the sheet information 403 (see FIG. 3), and for example, a table indicating a relationship between the sheet information 403 and the first threshold TH1 and the second threshold TH2 may be stored in the ROM 402*b* in advance. In the present embodiment, as illustrated in FIG. 6, in a case of conveying a sheet having a first stiffness, the fixing motor M1 is controlled using the first threshold TH1 and the second threshold TH2.

That is, in a case where the detected bending amount of the sheet S exceeds the first threshold TH1, that is, in a case where the bending amount becomes excessive, the control unit 401 switches the speed of the fixing motor M1 to a speed R1 in order to reduce the bending amount. In a case where the detected bending amount of the sheet S falls below the second threshold TH2, that is, in a case where the bending amount is excessively small, the control unit 401 switches the speed of the fixing motor M1 to a speed R2 in order to increase the bending amount. When the speed of the fixing motor M1 is switched to the speed R1, the fixing conveyance speed becomes the speed V1, and when the speed of the fixing motor M1 is switched to the speed R2, the fixing conveyance speed becomes the speed V2.

In a case where it is determined that the bending amount control end timing has been reached (step S20: Yes), the control unit 401 stops the detection of the bending amount by the detection unit 180 (step S21), and ends the bending amount control.

As described above, in the present embodiment, the influence of the variation in the standby position of the first flag 80 can be reset by resetting the count of the pulse signals of the bending amount detection sensor 81 when the detection position sensor 82 is turned on. As a result, it is possible to improve accuracy in detecting the bending amount while detecting a plurality of types of bending amounts. Then, the control unit 401 can maintain the bending amount of the sheet S within an appropriate range by controlling the fixing conveyance speed based on the pulse signal output from the bending amount detection sensor 81 (rotary encoder 260) after the first flag 80 reaches the detection position. As a result, the occurrence of the color shift, paper wrinkles, image disturbance, and the like can be suppressed.

In FIGS. 6 and 7 described above, an example in which the fixing motor M1 is controlled using the first threshold TH1 and the second threshold TH2 when the sheet S having the first stiffness is conveyed has been described. More specifically, in a case where the detection unit 180 has detected the bending amount of the sheet S that exceeds the first threshold TH1, the control unit 401 sets the fixing conveyance speed to the speed V1 serving as a first conveyance speed. In a case where the detection unit 180 detects the bending amount of the sheet S that is smaller than the second threshold TH2, the control unit 401 sets the fixing conveyance speed to the speed V2 serving as a second conveyance speed. The transfer conveyance speed is lower than the speed V1 and higher than the speed V2. That is, the control unit 401 controls the fixing conveyance speed such that the bending amount of the sheet S becomes a first bending amount.

On the other hand, for example, when the sheet S having a second stiffness lower than the first stiffness is conveyed, the control unit 401 controls the fixing motor M1 using a third threshold TH3 larger than the first threshold TH1 and a fourth threshold TH4 larger than the second threshold TH2. More specifically, in a case where the detection unit 180 has detected the bending amount of the sheet S that exceeds the third threshold TH3, the control unit 401 sets the fixing conveyance speed to the speed V1. In a case where the detection unit 180 has detected the bending amount of the sheet S that is smaller than the fourth threshold TH4, the control unit 401 sets the fixing conveyance speed to the speed V2. That is, the control unit 401 controls the fixing conveyance speed such that the bending amount of the sheet S becomes a second bending amount larger than the first bending amount.

For example, the sheet having the first stiffness is thick paper, and the sheet having the second stiffness is thin paper or plain paper. The thin paper is, for example, a sheet having a grammage of 52 to 59 [g/m$^2$], the plain paper is, for example, a sheet having a grammage of 64 to 105 [g/m$^2$], and the thick paper is, for example, a sheet having a grammage of 106 to 300 [g/m$^2$].

A resolution of the rotary encoder 260 may be arbitrarily set, and the rotary encoder 260 can detect the bending amounts (loop amounts) of at least three sheets S. Therefore, the bending amount can be controlled so as to be an appropriate bending amount according to the type of sheet, and image defects and sheet wrinkles can be suppressed even when various types of sheets are conveyed.

Second Embodiment

Figure 8:
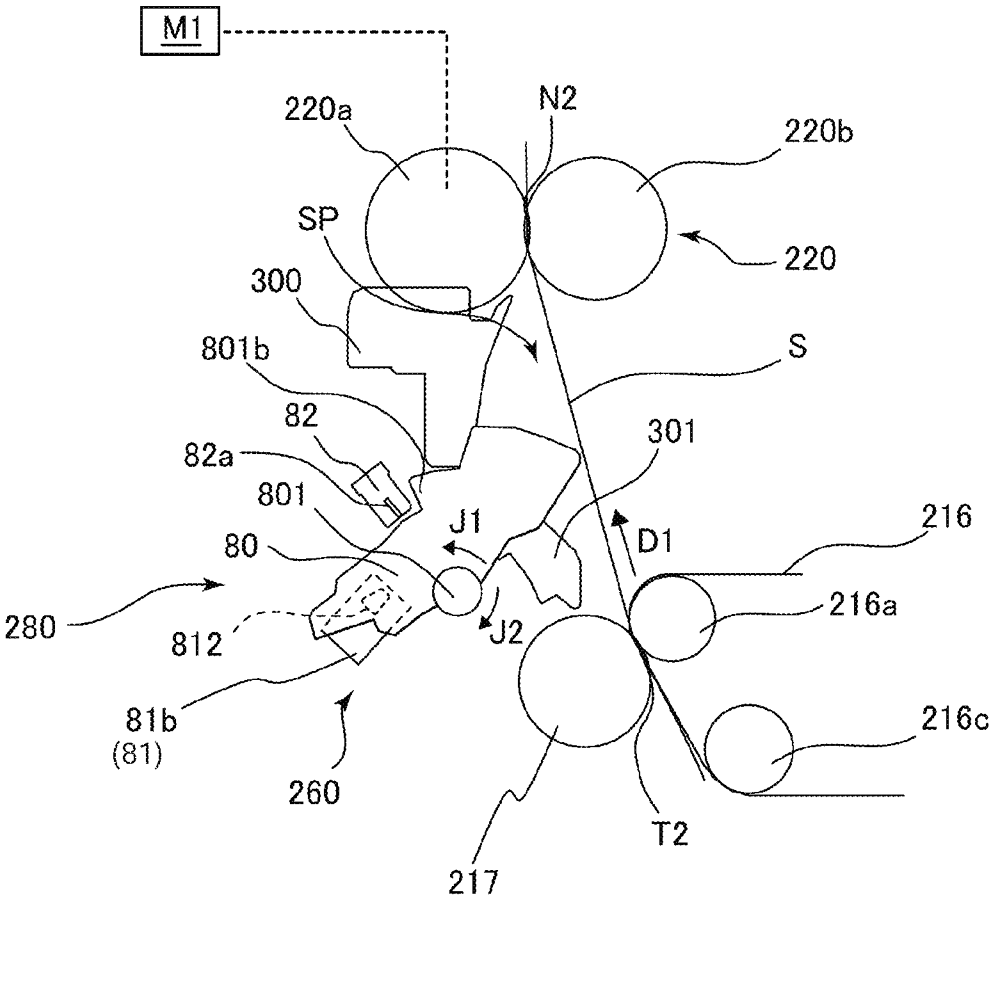
FIG. 8 is a cross-sectional view illustrating a detection unit according to a second embodiment.

Next, a second embodiment of the present invention will be described, and the second embodiment has a configuration in which the configuration of the detection unit 180 according to the first embodiment is changed. Therefore, a configuration similar to that of the first embodiment will be described in a manner of omitting illustration or attaching the same reference numerals in the drawings. FIG. 8 is a cross-sectional view illustrating a detection unit 280 according to the second embodiment.

As illustrated in FIG. 8, the detection unit 280 according to the second embodiment includes a first flag 80 serving as a rotation portion, a detector 81*b*, and a detection position sensor 82. That is, in the detection unit 280 according to the second embodiment, the second flag 81*a* of the detection unit 180 according to the first embodiment is omitted, and a rotation amount of the first flag 80 is detected by the detector 81*b*.

Similarly to the first embodiment, the detection position sensor 82 detects that the first flag 80 has reached a detection position. The first flag 80 includes a detected portion 812, and the detected portion 812 and the detector 81*b* form a rotary encoder 260. Then, the rotary encoder 260 outputs a pulse signal corresponding to the rotation amount of the first flag 80. Since bending control using the detection unit 280 is similar to that of the first embodiment, a description thereof will be omitted.

As described above, even when the rotation portion that rotates by being pressed by a sheet S is implemented only by the first flag 80, the same effects as those of the first embodiment can be obtained.

Other Embodiments

In any of the embodiments described above, the control unit 401 controls the bending amount of the sheet S by switching the fixing conveyance speed to the speed V1 or the speed V2, but the present technology is not limited thereto. For example, the control unit 401 may set the fixing conveyance speed to be the same as the transfer conveyance speed in a case where the bending amount corresponding to the stiffness of the sheet S is detected.

In the first embodiment, the detection position sensor 82 detects that the first flag 80 has reached the detection position, but the present technology is not limited thereto. For example, the detection position sensor 82 may detect that the second flag 81*a* has reached the detection position.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-000215, filed Jan. 4, 2024, which is hereby incorporated by reference herein in its entirety.

What is claimed is:

1. An image forming apparatus comprising:

a transfer portion configured to convey a sheet while nipping the sheet and transfer a toner image to the sheet;

a fixing portion configured to convey the sheet while nipping the sheet and fix the toner image transferred by the transfer portion to the sheet;

a detection unit disposed between the transfer portion and the fixing portion in a sheet conveyance direction and configured to detect a bending amount of the sheet nipped between the transfer portion and the fixing portion; and a control unit, wherein the detection unit includes:

a first rotation member configured to rotate in a rotation direction from a standby position by being pressed by the sheet nipped by the transfer portion and the fixing portion;

a second rotation member configured to rotate by being pressed by the first rotation member;

a rotary encoder configured to output a pulse signal corresponding to a rotation amount of the second rotation member; and a rotation detector configured to detect that the first rotation member has reached a detection position downstream of the standby position in the rotation direction, and the control unit controls a sheet conveyance speed of the fixing portion based on the pulse signal output from the rotary encoder after the rotation detector detects that the first rotation member has reached the detection position.

2. The image forming apparatus according to claim 1, wherein the rotation detector is provided independently with respect to the rotary encoder.

3. The image forming apparatus according to claim 1, wherein the control unit resets a count of the pulse signal output from the rotary encoder based on a detection result of the rotation detector indicating that the first rotation member has reached the detection position, and controls the sheet conveyance speed of the fixing portion based on the count of the pulse signal after the first rotation member reaches the detection position.

4. The image forming apparatus according to claim 1, wherein the rotation detector is constituted by a photo-interrupter.

5. The image forming apparatus according to claim 1, wherein the control unit (i) controls the sheet conveyance speed of the fixing portion such that the bending amount of the sheet becomes a first bending amount in a case of conveying the sheet having a first stiffness, and (ii) controls the sheet conveyance speed of the fixing portion such that the bending amount of the sheet becomes a second bending amount larger than the first bending amount in a case of conveying the sheet having a second stiffness lower than the first stiffness.

6. The image forming apparatus according to claim 5, wherein the control unit, in a case of conveying the sheet having the first stiffness, (i) sets the sheet conveyance speed of the fixing portion to a first conveyance speed if the detection unit has detected the bending amount of the sheet becomes larger than a first threshold, and (ii) sets the sheet conveyance speed of the fixing portion to a second conveyance speed which is slower than the first conveyance speed if the detection unit has detected the bending amount of the sheet becomes smaller than a second threshold which is smaller than the first threshold, the control unit, in a case of conveying the sheet having the second stiffness, (iii) sets the sheet conveyance speed of the fixing portion to the first conveyance speed if the detection unit has detected the bending amount of the sheet becomes larger than a third threshold which is larger than the first threshold, and (iv) sets the sheet conveyance speed of the fixing portion to the second conveyance speed if the detection unit has detected the bending amount of the sheet becomes smaller than a fourth threshold which is larger than the third threshold, and a sheet conveyance speed of the transfer portion is slower than the first conveyance speed and faster than the second conveyance speed.

7. The image forming apparatus according to claim 1, wherein the control unit (i) sets the sheet conveyance speed of the fixing portion to a first conveyance speed if the detection unit has detected the bending amount of the sheet becomes larger than a first threshold, and (ii) sets the sheet conveyance speed of the fixing portion to a second conveyance speed which is slower than the first conveyance speed if the detection unit has detected the bending amount of the sheet becomes smaller than a second threshold which is smaller than the first threshold, and a sheet conveyance speed of the transfer portion is slower than the first conveyance speed and faster than the second conveyance speed.

8. An image forming apparatus comprising:

a transfer portion configured to convey a sheet while nipping the sheet and transfer a toner image to the sheet;

a fixing portion configured to convey the sheet while nipping the sheet and fix the toner image transferred by the transfer portion to the sheet;

a detection unit disposed between the transfer portion and the fixing portion in a sheet conveyance direction and configured to detect a bending amount of the sheet nipped between the transfer portion and the fixing portion; and a control unit, wherein the detection unit includes:

a first rotation member configured to rotate by being pressed by the sheet nipped by the transfer portion and the fixing portion;

a second rotation member configured to rotate in a rotation direction from a standby position by being pressed by the first rotation member;

a rotary encoder configured to output a pulse signal corresponding to a rotation amount of the second rotation member; and a rotation detector configured to detect that the second rotation member has reached a detection position downstream of the standby position in the rotation direction, and the control unit controls a sheet conveyance speed of the fixing portion based on the pulse signal output from the rotary encoder after the rotation detector detects that the second rotation member has reached the detection position.

9. The image forming apparatus according to claim 8, wherein the rotation detector is provided independently with respect to the rotary encoder.

10. The image forming apparatus according to claim 8, wherein the control unit resets a count of the pulse signal output from the rotary encoder based on a detection result of the rotation detector indicating that the first rotation member has reached the detection position, and controls the sheet conveyance speed of the fixing portion based on the count of the pulse signal after the first rotation member reaches the detection position.

11. The image forming apparatus according to claim 8, wherein the rotation detector is constituted by a photo-interrupter.

12. The image forming apparatus according to claim 8, wherein the control unit (i) controls the sheet conveyance speed of the fixing portion such that the bending amount of the sheet becomes a first bending amount in a case of conveying the sheet having a first stiffness, and (ii) controls the sheet conveyance speed of the fixing portion such that the bending amount of the sheet becomes a second bending amount larger than the first bending amount in a case of conveying the sheet having a second stiffness lower than the first stiffness.

13. The image forming apparatus according to claim 12, wherein the control unit, in a case of conveying the sheet having the first stiffness, (i) sets the sheet conveyance speed of the fixing portion to a first conveyance speed if the detection unit has detected the bending amount of the sheet becomes larger than a first threshold, and (ii) sets the sheet conveyance speed of the fixing portion to a second conveyance speed which is slower than the first conveyance speed if the detection unit has detected the bending amount of the sheet becomes smaller than a second threshold which is smaller than the first threshold, the control unit, in a case of conveying the sheet having the second stiffness, (iii) sets the sheet conveyance speed of the fixing portion to the first conveyance speed if the detection unit has detected the bending amount of the sheet becomes larger than a third threshold which is larger than the first threshold, and (iv) sets the sheet conveyance speed of the fixing portion to the second conveyance speed if the detection unit has detected the bending amount of the sheet becomes smaller than a fourth threshold which is larger than the third threshold, and a sheet conveyance speed of the transfer portion is slower than the first conveyance speed and faster than the second conveyance speed.

14. The image forming apparatus according to claim 8, wherein the control unit (i) sets the sheet conveyance speed of the fixing portion to a first conveyance speed if the detection unit has detected the bending amount of the sheet becomes larger than a first threshold, and (ii) sets the sheet conveyance speed of the fixing portion to a second conveyance speed which is slower than the first conveyance speed if the detection unit has detected the bending amount of the sheet becomes smaller than a second threshold which is smaller than the first threshold, and a sheet conveyance speed of the transfer portion is slower than the first conveyance speed and faster than the second conveyance speed.

15. An image forming apparatus comprising:

a transfer portion configured to convey a sheet while nipping the sheet and transfer a toner image to the sheet;

a fixing portion configured to convey the sheet while nipping the sheet and fix the toner image transferred by the transfer portion to the sheet;

a detection unit disposed between the transfer portion and the fixing portion in a sheet conveyance direction and configured to detect a bending amount of the sheet nipped between the transfer portion and the fixing portion; and a control unit, wherein the detection unit includes:

one flag configured to rotate in a rotation direction from a standby position by being pressed by the sheet nipped by the transfer portion and the fixing portion, the flag including a first detected portion and a second detected portion;

a rotary encoder configured to output a pulse signal corresponding to a rotation amount of the flag by detecting the first detected portion; and a rotation detector configured to detect that the flag has reached a detection position downstream of the standby position in the rotation direction by detecting the second detected portion, and the control unit controls a sheet conveyance speed of the fixing portion based on the pulse signal output from the rotary encoder after the rotation detector detects that the flag has reached the detection position.

16. The image forming apparatus according to claim 15, wherein the rotation detector is provided independently with respect to the rotary encoder.

17. The image forming apparatus according to claim 15, wherein the control unit resets a count of the pulse signal output from the rotary encoder based on a detection result of the rotation detector indicating that the flag has reached the detection position, and controls the sheet conveyance speed of the fixing portion based on the count of the pulse signal after the flag reaches the detection position.

18. The image forming apparatus according to claim 15, wherein the rotation detector is constituted by a photo-interrupter.

19. The image forming apparatus according to claim 15, wherein the control unit (i) controls the sheet conveyance speed of the fixing portion such that the bending amount of the sheet becomes a first bending amount in a case of conveying the sheet having a first stiffness, and (ii) controls the sheet conveyance speed of the fixing portion such that the bending amount of the sheet becomes a second bending amount larger than the first bending amount in a case of conveying the sheet having a second stiffness lower than the first stiffness.

20. The image forming apparatus according to claim 19, wherein the control unit, in a case of conveying the sheet having the first stiffness, (i) sets the sheet conveyance speed of the fixing portion to a first conveyance speed if the detection unit has detected the bending amount of the sheet becomes larger than a first threshold, and (ii) sets the sheet conveyance speed of the fixing portion to a second conveyance speed which is slower than the first conveyance speed if the detection unit has detected the bending amount of the sheet becomes smaller than a second threshold which is smaller than the first threshold, the control unit, in a case of conveying the sheet having the second stiffness, (iii) sets the sheet conveyance speed of the fixing portion to the first conveyance speed if the detection unit has detected the bending amount of the sheet becomes larger than a third threshold which is larger than the first threshold, and (iv) sets the sheet conveyance speed of the fixing portion to the second conveyance speed if the detection unit has detected the bending amount of the sheet becomes smaller than a fourth threshold which is larger than the third threshold, and a sheet conveyance speed of the transfer portion is slower than the first conveyance speed and faster than the second conveyance speed.

21. The image forming apparatus according to claim 15, wherein the control unit (i) sets the sheet conveyance speed of the fixing portion to a first conveyance speed if the detection unit has detected the bending amount of the sheet becomes larger than a first threshold, and (ii) sets the sheet conveyance speed of the fixing portion to a second conveyance speed which is slower than the first conveyance speed if the detection unit has detected the bending amount of the sheet becomes smaller than a second threshold which is smaller than the first threshold, a sheet conveyance speed of the transfer portion is slower than the first conveyance speed and faster than the second conveyance speed.

* * * * *